US008228101B2

(12) United States Patent
Nimaiyar et al.

(10) Patent No.: US 8,228,101 B2
(45) Date of Patent: Jul. 24, 2012

(54) SOURCE-SYNCHRONOUS CLOCKING

(75) Inventors: Rahul Nimaiyar, Sunnyvale, CA (US);
Ravi Sunkavalli, Milpitas, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 172 days.

(21) Appl. No.: 12/558,985

(22) Filed: Sep. 14, 2009

(65) Prior Publication Data
US 2011/0062999 A1 Mar. 17, 2011

(51) Int. Cl.
*H03L 7/00* (2006.01)
(52) U.S. Cl. ......... 327/152; 327/144; 327/149; 327/153
(58) Field of Classification Search .................. 327/141, 327/144–163; 331/15–17; 375/373–376
See application file for complete search history.

(56) References Cited

U.S. PATENT DOCUMENTS

| 6,429,715 | B1* | 8/2002 | Bapat et al. ............. 327/295 |
| 6,570,944 | B2* | 5/2003 | Best et al. ............... 375/355 |
| 6,687,322 | B1* | 2/2004 | Zhang et al. ............ 375/376 |
| 2003/0043926 | A1* | 3/2003 | Terashima et al. ....... 375/257 |
| 2004/0057548 | A1* | 3/2004 | Su et al. ................. 375/376 |
| 2005/0122153 | A1* | 6/2005 | Lin ........................ 327/291 |
| 2007/0097778 | A1* | 5/2007 | LaBerge ................. 365/233 |

* cited by examiner

*Primary Examiner* — Lincoln Donovan
*Assistant Examiner* — Brandon S Cole
(74) *Attorney, Agent, or Firm* — Schwegman, Lundberg & Woessner, P.A.

(57) ABSTRACT

Methods, circuits and systems for balanced distribution of source-synchronous clock signals are described. Multiple data sets together with one or more clock signals associated with the multiple data sets may be received at a number of interface devices. The multiple data sets may be captured in a number of data buffers. The clock signals may be programmably distributed to a group of the multiple data buffers that retain the one or more data sets, using a balanced clock network. Additional methods, circuits, and systems are disclosed.

22 Claims, 6 Drawing Sheets

SOURCE-SYNCHRONOUS CLOCKING

BACKGROUND

Clock signals may play many roles in synchronous systems. For example, data movement in various elements of a synchronous circuit may be regulated by one or more clock signals. In some cases, a large, pipelined circuit may comprise numerous clocked elements such as latches, flip-flops, and the like. In others, a synchronous circuit may comprise one or more clock domains each operating at a different frequency. Other uses of clock signals in synchronous systems are also possible.

BRIEF DESCRIPTION OF THE DRAWINGS

Some embodiments of the disclosed technology are illustrated by way of example and not limitation in the figures of the accompanying drawings in which.

DETAILED DESCRIPTION

Example methods, circuits, and systems that implement balanced distribution of source-synchronous clock signals will now be described. In the following description, numerous examples having example-specific details are set forth to provide an understanding of example embodiments. It will be evident, however, to one of ordinary skill in the art, after reading this disclosure, that the present examples may be practiced without these example-specific details, and/or with different combinations of the details than are given here. Thus, specific embodiments are given for the purpose of simplified explanation, and not limitation.

Some embodiments described herein may comprise a method including receiving multiple data sets together with associated clock signals at a number of interface devices. The multiple data sets may be captured in a number of data buffers. The clock signals may be programmably distributed to a group of the data buffers (a "buffer group") that retain the data sets, using a balanced clock network.

Figure 1:
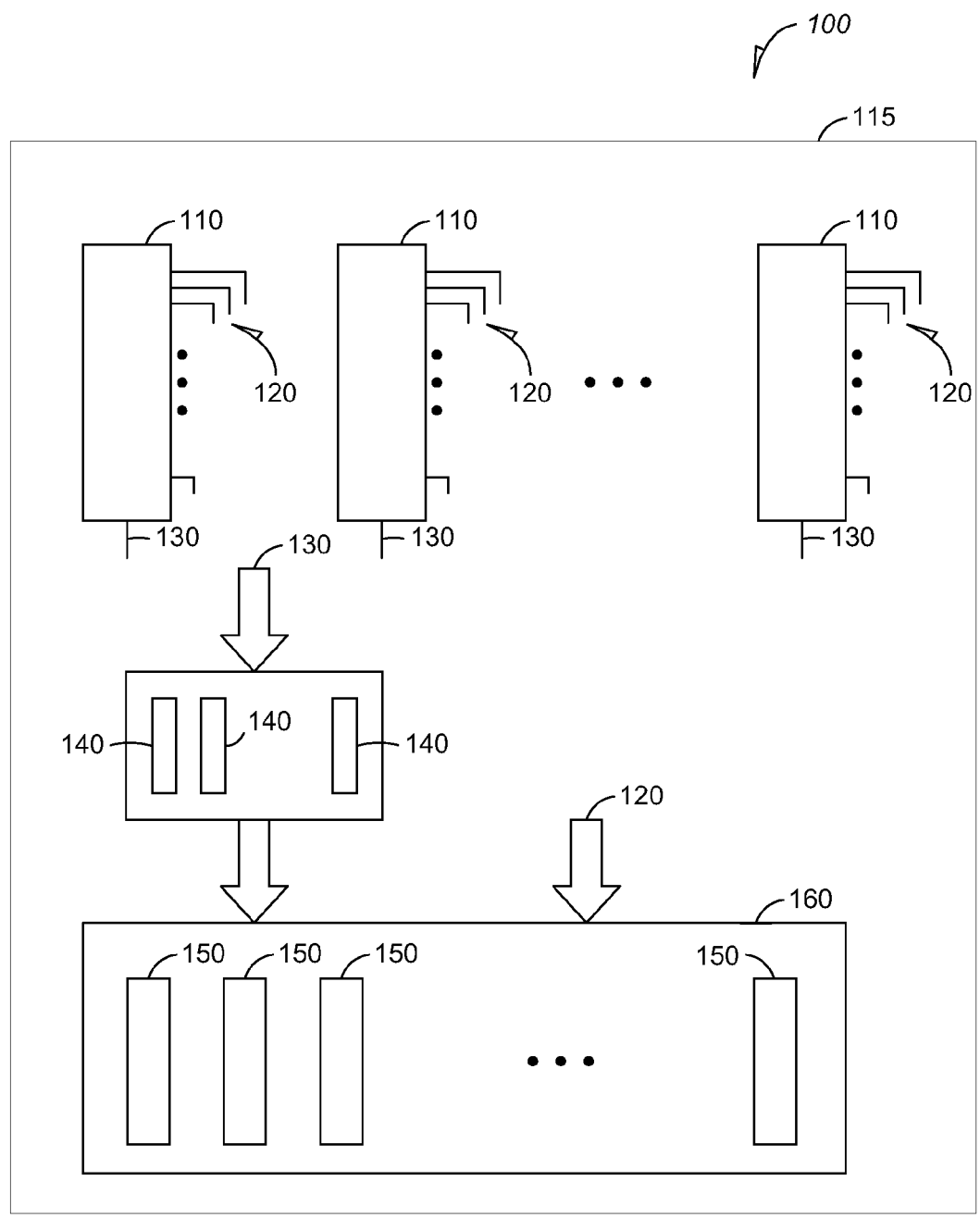
FIG. 1 is a block diagram of a system for implementing a source-synchronous clock network, according to various embodiments of the invention.

FIG. 1 is a block diagram of a system 100 for implementing a source-synchronous clock network, according to various embodiments of the invention. The system 100 may be implemented as an integrated circuit 115 to facilitate synchronous operations on data stored in the one or more data buffers 150. The integrated circuit 115 may comprise one or more interface devices 110, a number of clock input/output (I/O) buffers 140, and one or more data buffers 150.

The interface devices 110 may be used to couple one or more sub-systems, chips, or circuits to other systems, chips, and/or circuits. Coupling may include the interchange of data synchronized by clock signals. For example, the interface device 110 may receive a data set 120 comprising a number of data bits and a clock signal 130. The clock signal 130 may be associated with the data set 120. The clock signal 130 and data bits of data set 120 may be aligned, in terms of an edge (e.g., a rising or a falling edge) of the clock signal 130, at the interface device 110. In an embodiment, the clock signal 130 may represent more than one clock signal. For example, the clock signal 130 may represent a clock signal and the inverse of that clock signal.

The data set 120 may be captured in a buffer group 160 of data buffers 150. The buffer group 160 may comprise a predefined number (e.g., 8, 9, 16, 18, 32, 36, or other numbers) of data buffers 150 each storing one data bit. The clock signals 130 may be captured in the clock input/output (I/O) buffers 140. The clock I/O buffers 140 may be capable of both receiving and transmitting clock signals 130. In embodiments, the clock I/O buffers may comprise two single-ended buffers or one differential pair buffer. The clock signals 130 may comprise "source-synchronized" clock signals that may be synchronized with a clock signal of a source from which data sets originate. Therefore, to keep the synchronization of the clock signals 130 intact, the clock signal 130 may be distributed to the data buffers 150 using balanced clock routing, as will be described below.

Figure 2:
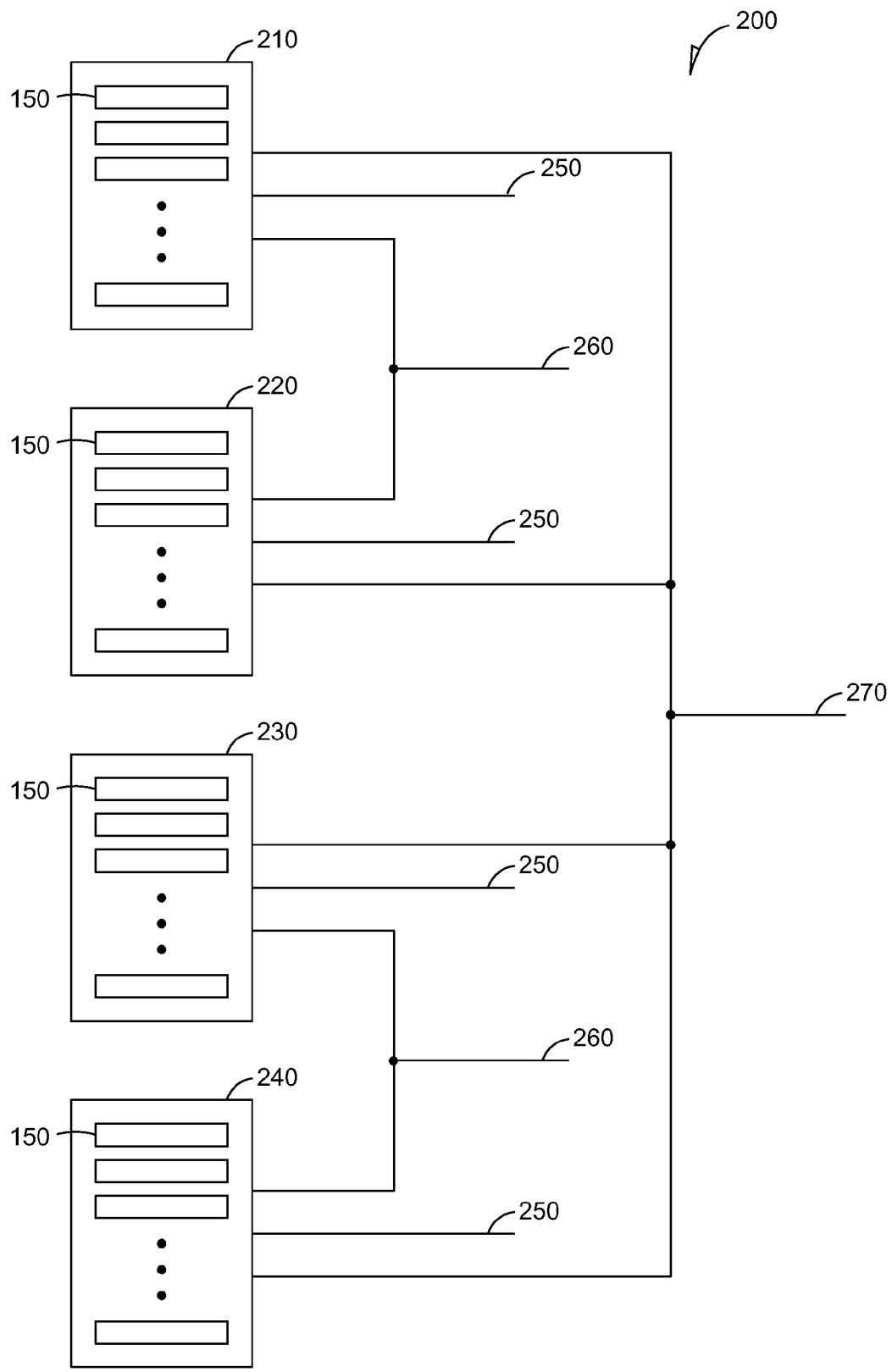
FIG. 2 is a diagram of a balanced clock tree for distributing a source-synchronous clock signal to multiple groups of data buffers, according to various embodiments of the invention.

FIG. 2 is a diagram of a balanced clock tree 200 for distributing a source-synchronous clock signal to multiple buffer groups 210-240, according to various embodiments of the invention. The number of data bits in a data set per clock signal that are received by the interface device 110 of FIG. 1 may vary, depending on the type of interface. For example, in some interface devices the source-synchronous clock signal (e.g., the clock signal 130 of FIG. 1) is associated with a data set 120 (FIG. 1) comprising, for example, 8, 16, or 32 bits of data. In other interface devices, such as some memory interfaces, the clock signal 130 may be associated with a data set 120 comprising, for example, 9, 18, or 36 bits of data. Clock routes 250, 260, and 270 shown in FIG. 2 may facilitate clock signal distribution from various types of interfaces to the buffer groups 210-240.

Buffer groups 210, 220, 230, and 240 each may comprise a number N (e.g., 8, 9, 12, etc.) of data buffers 150. The number of data buffers may be different in different groups. The clock signals 130 that are associated with N bits of data may be routed, using one of the clock routes 250, to one or more of the buffer groups 210, 220, 230, and 240. In some embodiments, interface devices 110 may support data sets 120 with 2N bits of data per clock signal, and the route 260 may be used to provide paths that direct clock signals 130 associated with the data sets 120 to two buffer groups (e.g., buffer groups 210 and 220, buffer groups 230 and 240, or other combinations not shown in FIG. 2).

Other routing is possible. For example, when the interface device 110 supports data sets 120 with 4N bits of data per clock signal, the clock route 270 may be used to couple the clock signal 130 to four buffer groups (e.g., buffer groups 210, 220, 230, and 240). The coupling of the clock signal 130 to various clock routes, such as clock routes 250-270 may be programmable. The programmability may be implemented by using additional hardware or software to vary the routing, as is well known to those of ordinary skill in the art. The software may be executed by one or more processors, such as the processor 660 shown in FIG. 6.

In some embodiments, the inverse of the clock signal 130 may also be programmably coupled to one or more of the buffer groups 210-240, using separate routes, similar to those shown for the clock routes 250-270. The clock routes 250-270 may be configured to provide substantially balanced paths for the clock signals 130. The substantially balanced paths may comprise two or more paths with approximately equal latencies for the clock signals 130. In some embodiments, the routes 250-270 may be configured so that the clock signals 130 traveling from the clock I/O buffers 140 of FIG. 1 to different buffer groups experience approximately equal latencies. For example, the clock routes 260 or 270 may respectively provide balanced paths for the clock signal 130 to buffer groups 210 and 220, or buffer groups 210, 220, 230, and 240. Balanced clock routes to distribute the clock signal 130 to the data buffers 150 of one of the buffer groups 210-240 will be described below.

Figure 3:
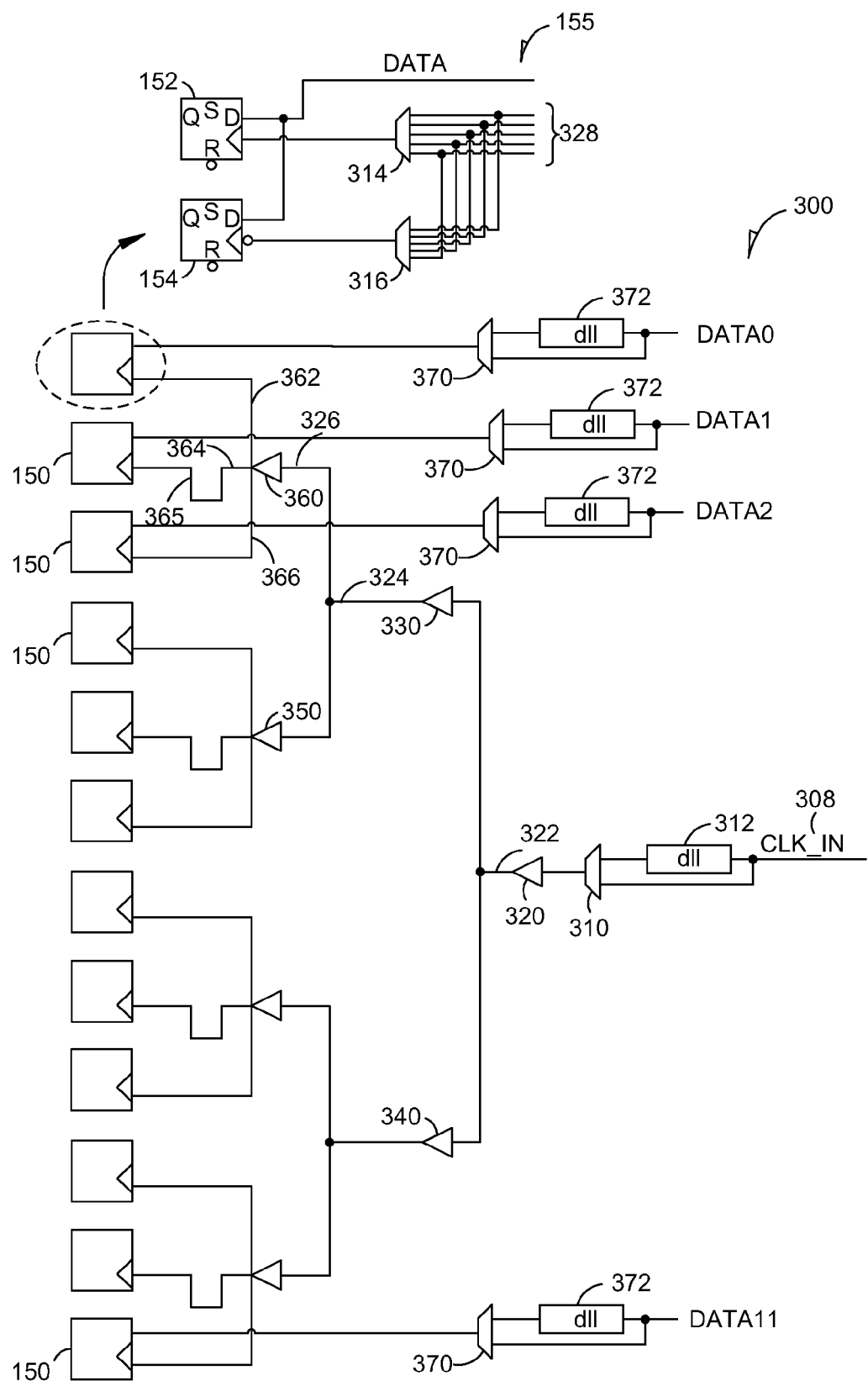
FIG. 3 is a diagram of balanced clock tree for distributing the source-synchronous clock signal to data buffers of a buffer group of FIG. 2, according to various embodiments of the invention.

FIG. 3 is a diagram of a balanced clock tree 300 for distributing the source-synchronous clock signal to data buffers 150 of the buffer group 210 of FIG. 2, according to various embodiments of the invention. In the example shown in FIG. 3, the buffer group 210 is assumed to comprise twelve data buffers 150. The clock signal 308 entering the buffer group 210 may represent any of the clock signals that are directed into the clock routes 250-270 of FIG. 2. A multiplexer 310 may be used to programmably direct reception by the driver 320 of one of the clock signal 308 or a replicated version of the clock signal 308, perhaps delayed via a delay line 312. The driver 320 may operate to fan out the received clock signal, as the clock signal 322, to the drivers 330 and 340.

The paths from the driver 320 to drivers 330 and 340 may provide approximately equal latencies for the clock signal 322 in reaching the drivers 330 and 340. Similar routes may be used to guide the clock signal 322 from drivers 330 and 340 to data buffers 150. Therefore, only the routes from the driver 330 to data buffers 150 are described here. The clock signal 324 may be fanned out with balanced routes to drivers 350 and 360. The driver 360 may operate to drive the clock signal 326 through three routes 362, 364 and 366 to data buffers 150. The routes 362 and 366 may have approximately equal lengths. In order to match the length of the route 364 with rotes 362 and 366, an additional path length 365 may be added to the route 364. The routes from the driver 350 to the data buffers 150 may be similar to the routes 362, 364, and 366.

The data bits of the data set (e.g., DATA0 to DATA11) associated with the clock signal 308 may be coupled to the data buffers 150, via optional delay lines 372 through multiplexers 370. The detailed diagram 155 shows an example structure of one data buffer 150. The flip-flops 152 and 154 may operate to receive clock signals with different polarities. The clock signal 328 is shown including four clock signals (e.g., including the clock signals from the clock routes 250-270 of FIG. 2), which may be programmably selected via multiplexers 314 and 316. The four clock signals included in the clock signal 328 may also be included in the clock signals 308, 322, 324, and 326.

Figure 4:
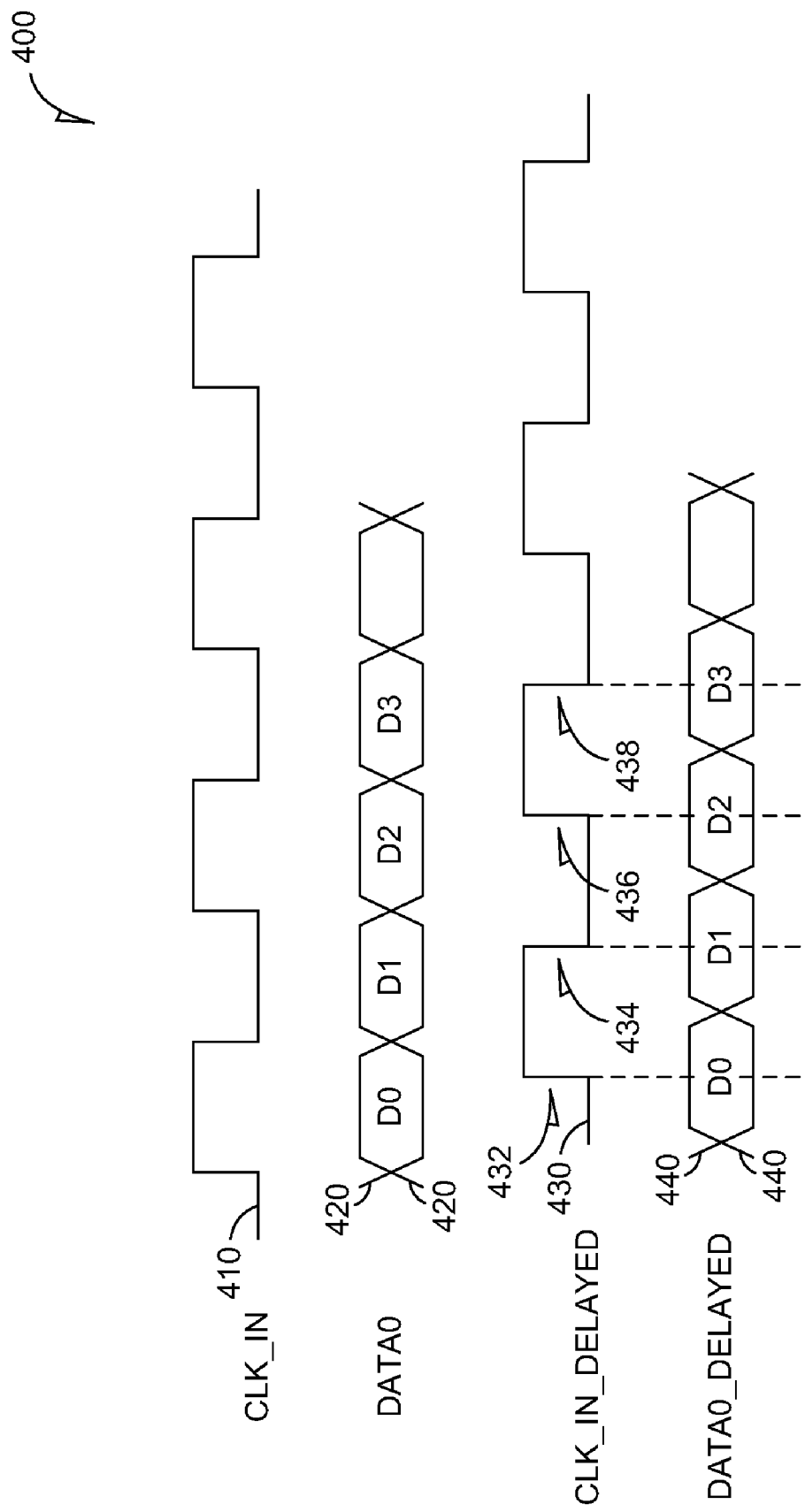
FIG. 4 is a timing diagram for a capture scheme for source-synchronous clock and data, according to various embodiments of the invention.

FIG. 4 is a timing diagram for a capture scheme 400 for source-synchronous clock and data, according to various embodiments of the invention. As shown in the data capture scheme 400, the clock and data signals 410 and 420 may be received as aligned signals. The clock and data signals 410 and 420 may come from a clock and data source and may also be synchronized with the clock source. The clock and data signals 410 and 420 may optionally be delayed via the delay lines 312 and 372 of FIG. 3, respectively.

The settings of the delay lines 312 and 372 may be such that the active transitions in a delayed clock signal 430 occur within a valid data time, such as approximately in the center of the eye of, a delayed data signal 440. For example, the rising edges 432, 434, 436, and 438 of the delayed clock signal 430 are shown to be aligned approximately with the centers of eyes D0, D1, D2, and D4 of the delayed data signal 440, respectively. The falling edges of the clock signal 430 may be similarly arranged with respect to the eyes of the data signals 440 in some embodiments. This timing technique may allow for an increase in useful timing margins when capturing the clock and data signals 410 and 420 in, for example, in data buffers 150 of FIG. 3.

Figure 5:
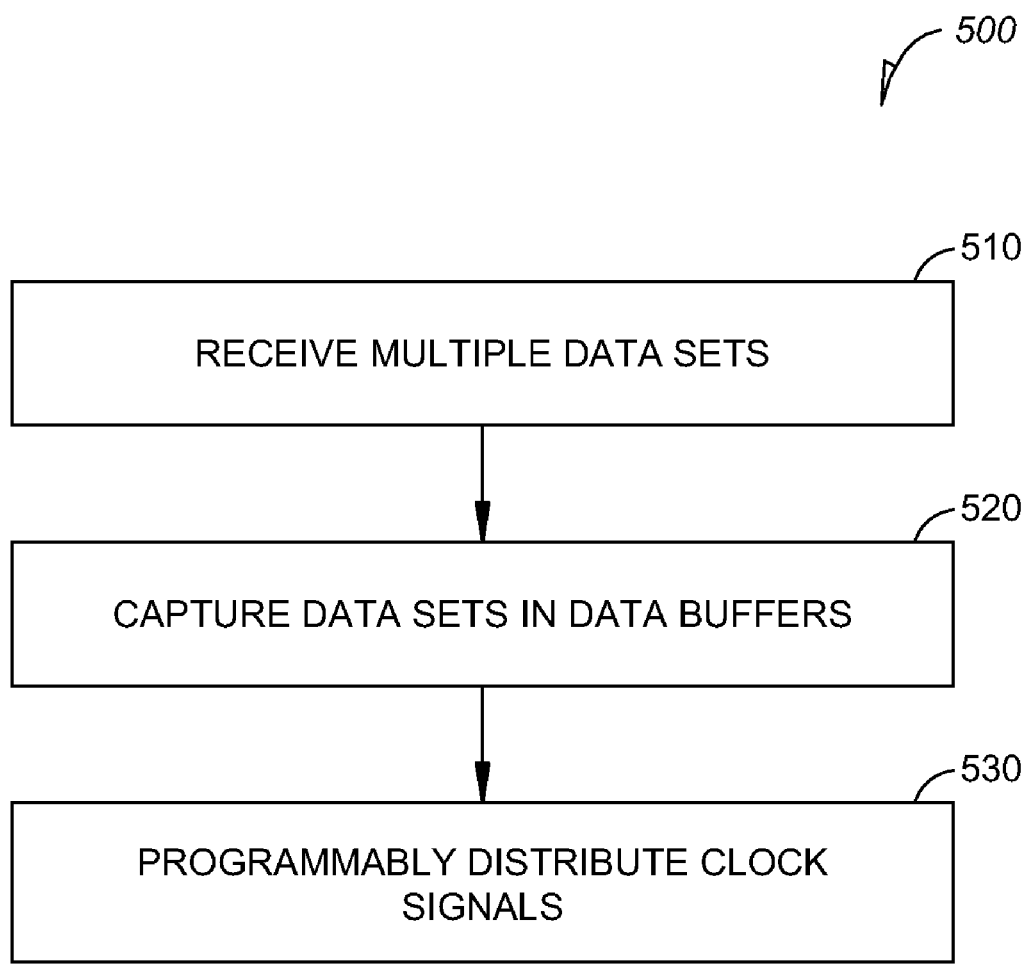
FIG. 5 is a flow diagram illustrating a method of distributing a source-synchronous clock signal, according to various embodiments of the invention.

FIG. 5 is a flow diagram illustrating a method 500 of distributing a source-synchronous clock signal, according to various embodiments of the invention. The method 500 may start with operation 510, where the multiple data sets 120 of FIG. 1 and one or more clock signals 130 of FIG. 1 associated with one or more of the data sets 120 are received at the interface device 110 of FIG. 1. At operation 520, the one or more data sets 120 may be captured in multiple data buffers 150 of FIG. 1. The one or more clock signals 130 may, at operation 530, be programmably distributed to data buffers 150 of the buffer group 160 of FIG. 1. The distribution may be performed using balanced clock networks (e.g., using the balanced clock trees 200 and 300 of FIG. 2 and FIG. 3, respectively). The balanced clock trees 200, 300 of FIGS. 2 and 3, respectively, may operate to provide substantially balanced clock routes for the clock signals 130. Substantially balanced clock routs may comprise clock routs with approximately equal latencies for the clock signals 130.

Figure 6:
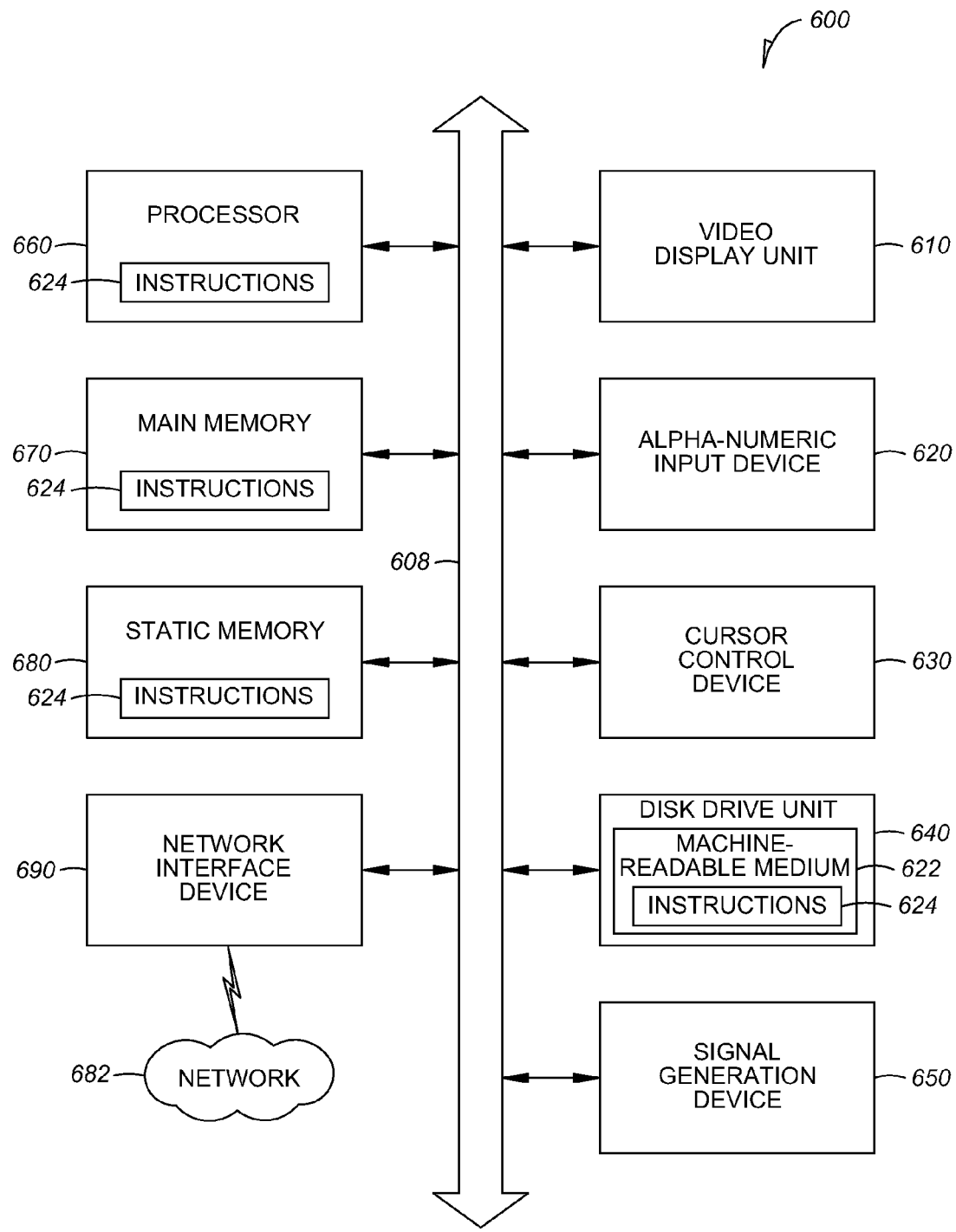
FIG. 6 is a block diagram of a machine, according to various embodiments of the invention.

FIG. 6 is a block diagram of a machine 600, according to various embodiments of the invention. The machine 600 comprises a set of instructions that can be executed to cause the machine 600 to perform any one or more of the methodologies discussed herein. In alternative embodiments, the machine 600 may operate as a standalone device or may be connected (e.g., networked) to other systems. In a networked deployment, the machine 600 may operate in the capacity of a server or a client system in a server-client network environment or as a peer system in a peer-to-peer (or distributed) network environment. Machine 600 may be realized as a specific machine in the form of a computer having a display and/or multiple processors, as well as a network interface. The machine 600 may operate to implement any one or more of the elements illustrated in FIGS. 1-4, as well as the methods described with respect to FIG. 5.

The machine 600 may comprise a server computer, a client computer, a personal computer (PC), a tablet PC, an integrated circuit, such as a field-programmable gate array (FPGA), or any system capable of executing a set of instructions (sequential or otherwise) that specify actions to be taken by that system. Further, while only a single machine is illustrated, the term "machine" shall also be taken to include any collection of systems that individually or jointly execute a set (or multiple sets) of instructions to perform any one or more of the methodologies discussed herein.

The example machine 600 may include the processor 660 (e.g., a central processing unit (CPU), a graphics processing unit (GPU) or both), a main memory 670 and a static memory 680, all of which communicate with each other via a bus 608. The machine 600 may further include a video display unit 610 (e.g., a liquid crystal display (LCD) or cathode ray tube (CRT)). The machine 600 also may include an alphanumeric input device 620 (e.g., a keyboard), a cursor control device 630 (e.g., a mouse), a disk drive unit 640, a signal generation device 650 (e.g., a speaker), and a network interface device 690. The machine 600 may include one or more of any of these elements.

The disk drive unit 640 may include a machine-readable medium 622 on which is stored one or more sets of instructions (e.g., software) 624 embodying any one or more of the methodologies or functions described herein. The instructions 624 may also reside, completely or at least partially, within the main memory 670 and/or within the processor 660 during execution thereof by the machine 600, with the main memory 670 and the processor 660 also constituting machine-readable media. The instructions 624 may further be transmitted or received over a network 682 via the network interface device 690.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that causes the machine to perform any one or more of the methodologies of the present technology. The term "machine-readable medium" shall accordingly be taken to include, but not be limited to tangible media, including solid-state memories and optical and magnetic media.

Various embodiments of a balanced clock tree for distribution of source-synchronous clock signals have been described. Implementing such clock trees in synchronous circuits/systems may result in an improved performance and possibly reduced power consumption, reduced die area, and increased processing speed. The described embodiments may improve performance of synchronous circuits/systems by reducing the length of clock routes and/or providing low-slew and substantially balanced clock routes.

Although various embodiments have been described, it will be evident, after reading this disclosure, that modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A computer-implemented method, comprising:
   receiving at least one data set of a plurality of data sets together with at least one clock signal of a plurality of clock signals at each of one or more interface devices, the at least one clock signal of the plurality of clock signals being associated with the at least one data set of the plurality of data sets;
   capturing the at least one data set in a plurality of data buffers; and
   programmably distributing the at least one clock signal to a group of the plurality of data buffers that retain the at least one data set, using a balanced clock network, the balanced clock network configured to select one of a plurality of clock routes for the at least one clock signal as a function of an amount of data bits associated with the at least one data set.

2. The method of claim 1, wherein at least some of the one or more interface devices support different numbers of data bits per clock signal.

3. The method of claim 1, wherein at least some of the plurality of clock signals are source-synchronized clock signals.

4. The method of claim 1, further comprising capturing at least some of the clock signals of the plurality of clock signals in clock input/output (I/O) buffers.

5. The method of claim 4, wherein at least some of the clock I/O buffers are to receive and/or transmit clock signals.

6. The method of claim 4, wherein at least some of the clock I/O buffers can be used as at least one of a two single-ended buffers or one differential pair buffer.

7. The method of claim 4, further comprising coupling at least one of the clock I/O buffers to at least some data buffers of one or more buffer groups of a plurality of buffer groups to transmit the at least one clock signal to the at least some data buffers of the one or more buffer groups.

8. The method of claim 7, wherein the using of the balanced clock network comprises balancing latencies of at least one transmitted clock signal from the at least one of the clock I/O buffer to the at least some data buffers.

9. The method of claim 7, wherein the coupling comprises coupling via a delay line.

10. The method of claim 1, further comprising combining at least some of the plurality of data buffers to form a plurality of buffer groups, each buffer groups comprising a predefined number of data bits.

11. The method of claim 1, further comprising delaying the at least one clock signal and at least some data of the plurality of data sets so that the at least one clock signal actively transitions approximately in a center of an eye of the at least some data.

12. An integrated circuit comprising:
   one or more interface devices, at least some of the interface devices to receive one data set together with at least one clock signal of a plurality of clock signals, the at least one clock signal being associated with the at least one data set of a plurality of data sets;
   a plurality of data buffers to capture the at least one data set; and
   a balanced clock network to programmably distribute the at least one clock signal to a group of the plurality of data buffers that retain the at least one data set, the balanced clock network configured to select one of a plurality of clock routes for the at least one clock signal as a function of an amount of data bits associated with the at least one data set.

13. The integrated circuit of claim 12, further comprising clock input/output (I/O) buffers to capture at least some clock signals of the plurality of clock signals.

14. The integrated circuit of claim 12, further comprising a plurality of buffer groups, each buffer group of the plurality of buffer groups including a predefined number of data buffers.

15. The integrated circuit of claim 14, further comprising clock input/output (I/O) buffers coupled to at least some data buffers of one or more buffer groups of the plurality to transmit the at least one clock signal to the at least some data buffers of the one or more buffer groups.

16. The integrated circuit of claim 15, wherein the balanced clock network is to balance latencies of at least one transmitted clock signal from at least one of the clock I/O buffers to the at least some data buffers.

17. The integrated circuit of claim 15, further comprising a delay line to couple at least one of the clock I/O buffers to the at least some data buffers.

18. The integrated circuit of claim 17, wherein the delay line is to delay the at least one clock signal and at least some data of the plurality of data sets so that the at least one clock signal actively transitions approximately in a center of an eye of the at least some data.

19. The integrated circuit of claim 12, wherein the plurality of clock routes comprises a first clock route and a second clock route, wherein the balanced clock network is configured to:
   select the first clock route based on a determination that an interface device at which the at least one data set is received supports a first amount of data bits per clock signal; and
   select the second clock route based on a determination that the interface device supports a second amount of data bits per clock signal, the second amount being different from the first amount.

20. The integrated circuit of claim 19, wherein the plurality of clock routes further comprises a third clock route, wherein the balanced clock network is further configured to select the third clock route based on a determination that the interface device supports a third amount of data bits per clock signal, the third amount being different from the first amount and the second amount.

21. A machine-readable medium comprising instructions which, when executed by a machine, cause the machine to perform a method, the method comprising:
   receiving at least one data set of a plurality of data sets together with at least one clock signal of a plurality of clock signals at each of one or more interface devices, the at least one clock signal of the plurality of clock signals being associated with the at least one data set of the plurality of data sets;
   capturing the at least one data set in a plurality of data buffers; and
   programmably distributing the at least one clock signal to a group of the plurality of data buffers that retain the at least one data set, using a balanced clock network, the balanced clock network configured to select one of a plurality of clock routes for the at least one clock signal as a function of an amount of data bits associated with the at least one data set.

22. A balanced clock network comprising:
   at least one clock input output buffer to receive a source-synchronous clock signal associated with a plurality of data sets;
   a delay line to receive the source-synchronous clock signal and to generate a plurality of replicated clock signals to replicate the source-synchronous clock signal; and
   a plurality of groups of clock routes, at least some of the plurality of groups of clock routes to programmably couple ones of the plurality of replicated clock signals to at least some of a plurality of groups of data buffers with approximately equal latencies, each of the at least some of the plurality of groups of clock routes being selected as a function of an amount of data bits associated with at least one of the plurality of data sets received together with the source-synchronous clock signal.

* * * * *